United States Patent [19]
Matsufuji

[11] Patent Number: 6,164,396
[45] Date of Patent: *Dec. 26, 2000

[54] TRAVELING OPERATION DEVICE FOR A WORKING VEHICLE

[75] Inventor: Mizuya Matsufuji, Amagasaki, Japan

[73] Assignee: Kanzaki Kokyukoki Mfg. Co., Ltd., Hyogo-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/035,144

[22] Filed: Mar. 5, 1998

[30] Foreign Application Priority Data

Mar. 5, 1997 [JP] Japan ................................ 9-050649

[51] Int. Cl.[7] .................................................. B60K 17/30
[52] U.S. Cl. ........................................................ 180/6.34
[58] Field of Search .................................. 180/336, 6.34, 180/6.32, 6.58, 6.2, 6.38, 6.48, 346

[56] References Cited

U.S. PATENT DOCUMENTS

| | | | |
|---|---|---|---|
| 4,126,202 | 11/1978 | Hern | 180/89.12 |
| 4,366,881 | 1/1983 | Frisbee | 180/271 |
| 4,759,417 | 7/1988 | Wanie et al. | 180/6.34 |
| 5,913,950 | 6/1999 | Matsufuji | 74/730.1 |

FOREIGN PATENT DOCUMENTS

| | | |
|---|---|---|
| 2-108116 | 8/1990 | Japan . |
| 6-20867 | 3/1994 | Japan . |

*Primary Examiner*—Kevin Hurley
*Assistant Examiner*—Kevin McKinley
*Attorney, Agent, or Firm*—Sterne, Kessler, Goldstein & Fox P.L.L.C.

[57] ABSTRACT

A traveling operation device for a vehicle, wherein a cruising control mechanism, which can artificially hold a speed changing instrument of a stepless transmission biased toward the neutral side in a desired speed change position and which is interlocked to be released by treading a master brake pedal, is disposed at one lateral side within a dashboard, and a parking locking mechanism, which can hold the master brake pedal in a treading position, is disposed at the other lateral side within the vehicle dashboard.

6 Claims, 13 Drawing Sheets

TRAVELING OPERATION DEVICE FOR A WORKING VEHICLE

BACKGROUND OF THE INVENTION

1. Field of the Invention

The present invention relates to a parking lock mechanism for brake pedals which operate braking units and a cruising control mechanism for a speed change pedal which operates a stepless transmission, both of the mechanisms being equipped on a working vehicle.

2. Related Art

A conventional working vehicle may include a step at one lateral side of the vehicle on which a speed change pedal is disposed which can change the traveling speed of the vehicle and can freely switch to the forward or rearward traveling direction. On the other lateral side of the working vehicle two left and right turn brake pedals are disposed which can independently brake left and right braking units. Additionally, a master brake pedal is generally disposed in the vicinity of the speed changing pedal to simultaneously activate both left and right braking units. Such a construction is disclosed in Japanese Patent Publication No. Hei 6-20867, for example.

Also, well-known is a construction which includes a pair of left and right brake pedals connected with a pair of left and right braking units, a speed change pedal for operating a hydraulic stepless transmission, a cruising control mechanism for locking the speed change pedal at a desired speed change position, and a releasing mechanism for releasing the braking state of speed change pedal when the left and right braking units are simultaneously operated. Such a construction is disclosed in Japanese Utility Model Laid-Open No. Hei 2-108116.

In the former conventional construction, it is disclosed that the left and right turn brake pedals are trod independently to operate the left and right braking units, respectively. When the master brake pedal is trod, an interlocking member simultaneously abuts against a connecting member of a right outer cylinder and an abutting member of a brake shaft so as to simultaneously operate the left and right braking units. This construction does not, however, disclose a cruising control mechanism, which can fix and release a desired forward traveling operation position of the running pedal.

In the latter construction, the locking mechanism for speed change pedals is provided in which the locked state of speed change pedal cannot be released without simultaneously treading the left and right brake pedals, the mounting portion of the locking mechanism being directly mounted to a vehicle frame, which is troublesome to assemble. Also, no parking lock mechanism for the braking pedal is provided.

SUMMARY OF THE INVENTION

A cruising control mechanism is provided which can artificially hold a speed changing unit of a stepless transmission biased to the neutral position in a desired speed change position. The cruising control mechanism is released by treading a master brake pedal which is disposed at one lateral side within a dashboard. A parking lock mechanism, which can hold the master brake pedal at one treading position, is disposed at the other lateral side within the same dashboard.

Furthermore, the operating unit for actuating the cruising control mechanism and that for actuating the parking lock mechanism are disposed on the dashboard. A locking pawl, engageable with a locking member which interlocks with the speed change unit of the stepless transmission, is swingably pivotally supported on one lateral side wall of a vehicle body frame, which is covered with the lower end of the dashboard, and interlocks with the operating unit for actuating the cruising control mechanism. A locking pawl engageable with a locking member interlocking with the master brake pedal is swingably pivotally supported onto the other lateral side wall of the same and interlocks with the operating unit for actuating the parking lock mechanism.

In the above-mentioned structures, the speed changing unit comprises a forward pedal trod when the vehicle forwardly travels and a reverse pedal trod when the same travels rearwardly. Both pedals are constructed as single-body pedal units mountable or detachable on or from the one lateral side wall of the vehicle body frame.

Also, in the above-mentioned structures, on the rear surface of the dashboard, the operating unit for actuating the cruising control mechanism is disposed on the one lateral side where the cruising control mechanism is disposed. The operating unit for actuating the parking lock mechanism is disposed on the other lateral side where the parking lock mechanism is disposed. These and other objects of the invention will become more apparent in the detailed description and example which follow.

DETAILED DESCRIPTION OF THE PREFERRED EMBODIMENTS

Figure 1:
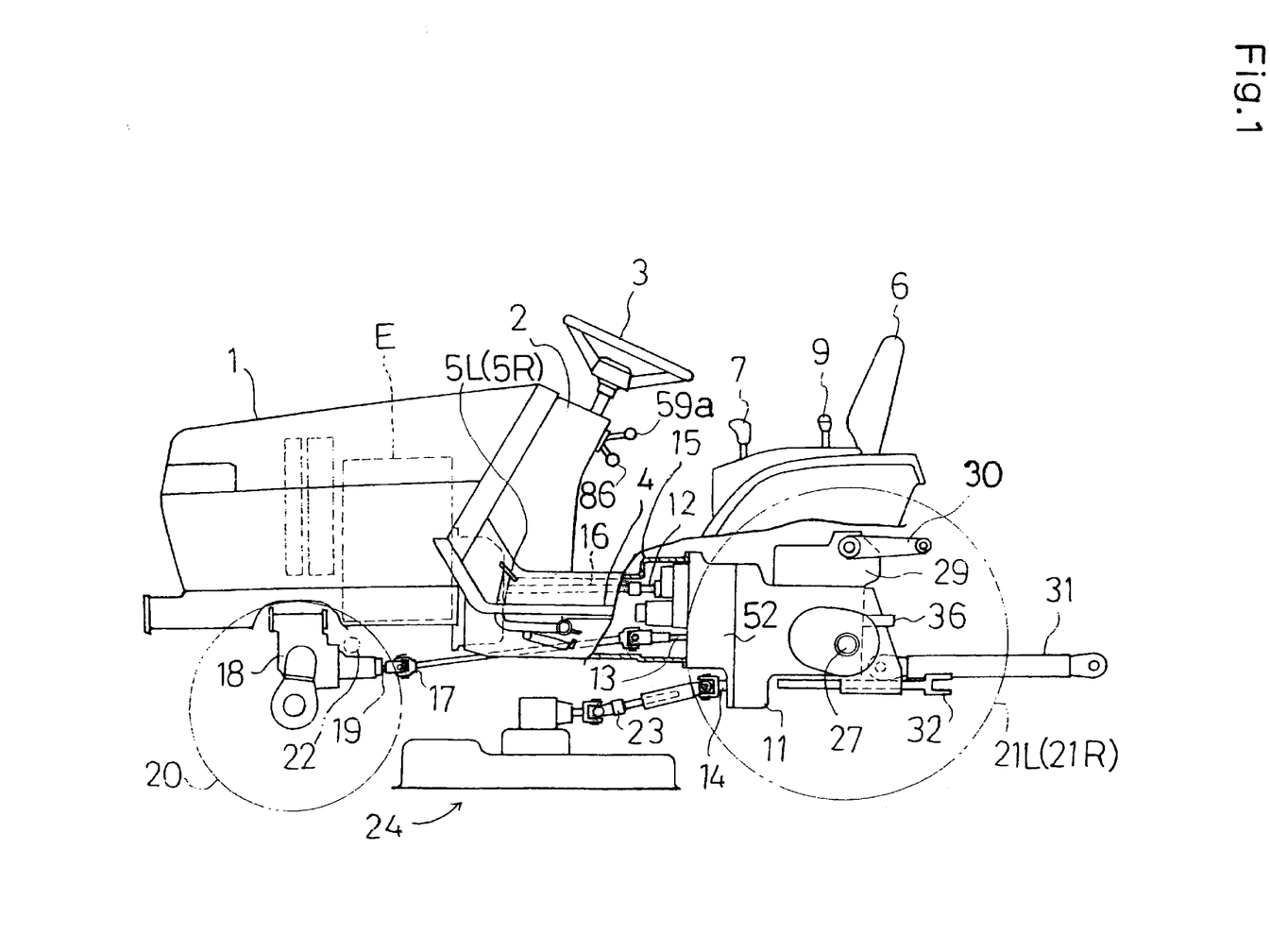
FIG. 1 is a left side view of a working vehicle equipped with the traveling operating device of the invention.

Referring to FIG. 1, explanation will be given on the entire construction of a working vehicle equipped with the traveling operation device of the present invention and a mower provided under the vehicle body. An engine E is mounted on a body frame within a bonnet 1 in the front of the vehicle body. A dashboard 2 is connected to the rear portion of bonnet 1. A steering wheel 3 is disposed on dashboard 2. Steps 4, through which an operator gets on and off the vehicle, are disposed between dashboard 2 and a seat 6 and project from both lateral sides of the vehicle body. A sub-speed-changing hand lever 7 and a PTO switching hand lever 9 are disposed on a lateral side of seat 6.

Under seat 6 is disposed a transmission casing 11, which is connected with engine E through a vehicle body frame 15 fixed to the front of transmission casing 11. Power from engine E is transmitted into transmission casing 11 through a damper joint housed in vehicle body frame 15, a transmission shaft 16 and an input shaft 12. From the front of transmission casing 11 project input shaft 12, a front wheel driving shaft 13 and a mid-PTO shaft 14. Power outputted from front wheel driving shaft 13 is transmitted into a front axle casing 18 through a universal joint 17 so as to drive front wheels 20 mounted onto front axles projecting from both sides of front axle casing 18. Power outputted from mid-PTO shaft 14 is transmitted through a universal joint 23 to a mower 24 for lawn mowing.

A rear axle casing is mounted at both sides of the rear of transmission casing 11 and rear wheels 21L and 21R are mounted to rear axles in casing 11. A hydraulic stepless transmission 52 is integrally provided in transmission casing 11. A forward pedal 8F and a reverse pedal 8R to be discussed below are operated to drive rear wheels 21L and 21R in the desired driving direction and driving speed. A hydraulic lifting unit 29 provided with lift arms 30 is mounted on the upper surface of transmission casing 11. Lift arms 30 of hydraulic lifting unit 29 are operable upwardly and downwardly. A working machine, such as a cultivator, can be vertically movably mounted to the rear portion of the vehicle through a lower link 31 rearwardly projecting from both sides of the lower portion of transmission casing 11, lift arms 30 and a top link (not shown). A rear PTO shaft 36 projects from the rear surface of transmission casing 11 to drive a working machine so mounted to the rear portion of the vehicle.

Next, explanation will be given on a brake operating unit equipped on the working vehicle. As shown in FIGS. 1, 2, 3 and 6, a left turn brake foot pedal 5L and a right turn brake pedal 5R are juxtaposed on step 4 at the left side of vehicle body frame 15 when looking forward. Forward pedal 8F and reverse pedal 8R are juxtaposed on right side step 4. A master brake pedal 10, extending across both pedals 8F and 8R, is disposed in front of and slightly above pedals 8F and 8R.

Figure 3:
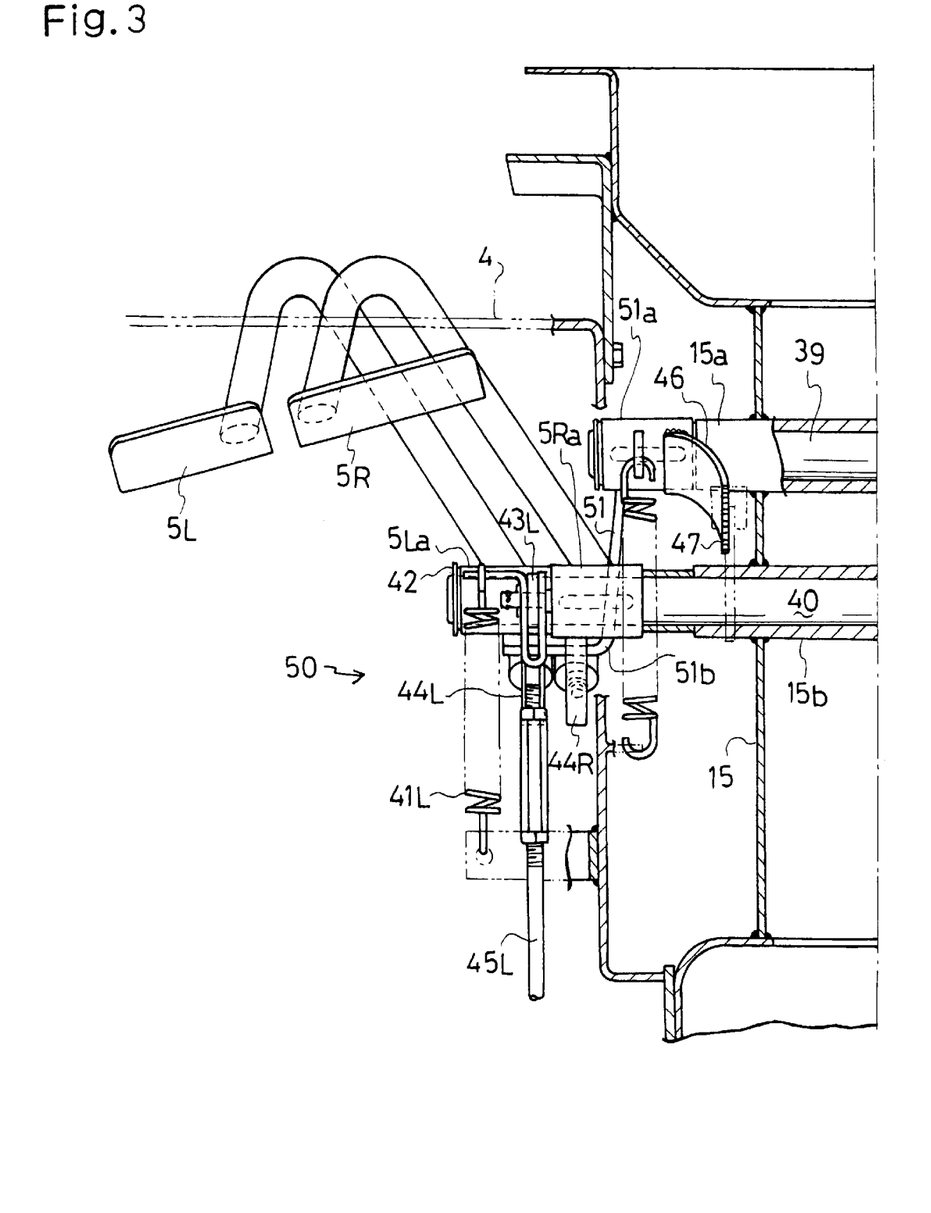
FIG. 3 is a sectional plan view of left and right brake pedals and a parking lock mechanism.

Two support pipes 15a and 15b extend laterally from vehicle body frame 15 and are fixedly disposed longitudinally of vehicle body frame 15, parallel to each other. A first brake pedal shaft 39 is rotatably supportingly inserted into front support pipe 15a and projects outwardly from the ends of the support pipe 15a at both the lateral ends thereof. A second brake pedal shaft 40 is rotatably supportingly inserted into rear support pipe 15b and projects outwardly from the ends of support pipe 15b at both the lateral ends thereof. On the left end of second brake pedal 40 are juxtaposed a tubular member 5La fixed to the base of the left turn brake pedal 5L and a tubular member 5Ra fixed to the base of the right turn brake pedal 5R. Tubular members 5La and 5Ra are axially locked by a snap ring 42. Tubular member 5La is relatively-rotatably connected with respect to second brake pedal shaft 40. An arm 43L and an abutting strip 44L project from the outer periphery of tubular member 5La. Arm 43L is connected with one end of a link 45L. The other end of link 45L is connected with a brake arm (not shown) of a left braking unit (not shown) for braking rear wheel 21L, generally constructed on the left side rear axle casing.

Tubular member 5Ra, positioned inwardly of the vehicle body more than tubular member 5La, is not relatively-rotatably connected through a key to second brake pedal shaft 40. An abutting strip 44R projects from the outer periphery of tubular member 5Ra. Right turn brake pedal 5R and left turn brake pedal 5L are constructed at the utmost ends of the arms which project slantingly forwardly and upwardly from tubular members 5Ra and 5La and bend halfway in a U-like shape so that the pedal faces are positioned in the same plane. Abutting strips 44L and 44R project slantingly rearwardly and downwardly from tubular members 5La and 5Ra and have both their abutting surfaces positioned in the same plane with respect to a pair of abutting members 53, to be discussed below. Another tubular member 5Rb is not relatively-rotatably connected to the right side end of second brake pedal shaft 40 through a pin. An arm 43R projects from tubular member 5Rb and connects with one end of a link 45R. The other end of link 45R is connected to a brake arm (not shown) of the right side braking unit (not shown) for braking rear wheel 21R, generally constructed on the right side rear axle casing. Tension spring 41L is stretched between arm 43L and a retaining portion on the lower surface of left step 4 and tension spring 41R is stretched between arm 43R and a retaining portion on the lower surface of right step 4 so as to bias the left and right braking units in the brake releasing directions. One of left and right turn brake pedals 5L or 5R is trod to rotate tubular members 5La or 5Ra counterclockwise when viewed in FIG. 4, so that arm 43L or 43R pulls links 45L or 45R against tension spring 41L or 41R so as to enable the left or right braking units to be independently controlled through the braking arms thereof(not shown), thereby braking either one of rear wheels 21L or 21R and turning the vehicle body.

Figure 2:
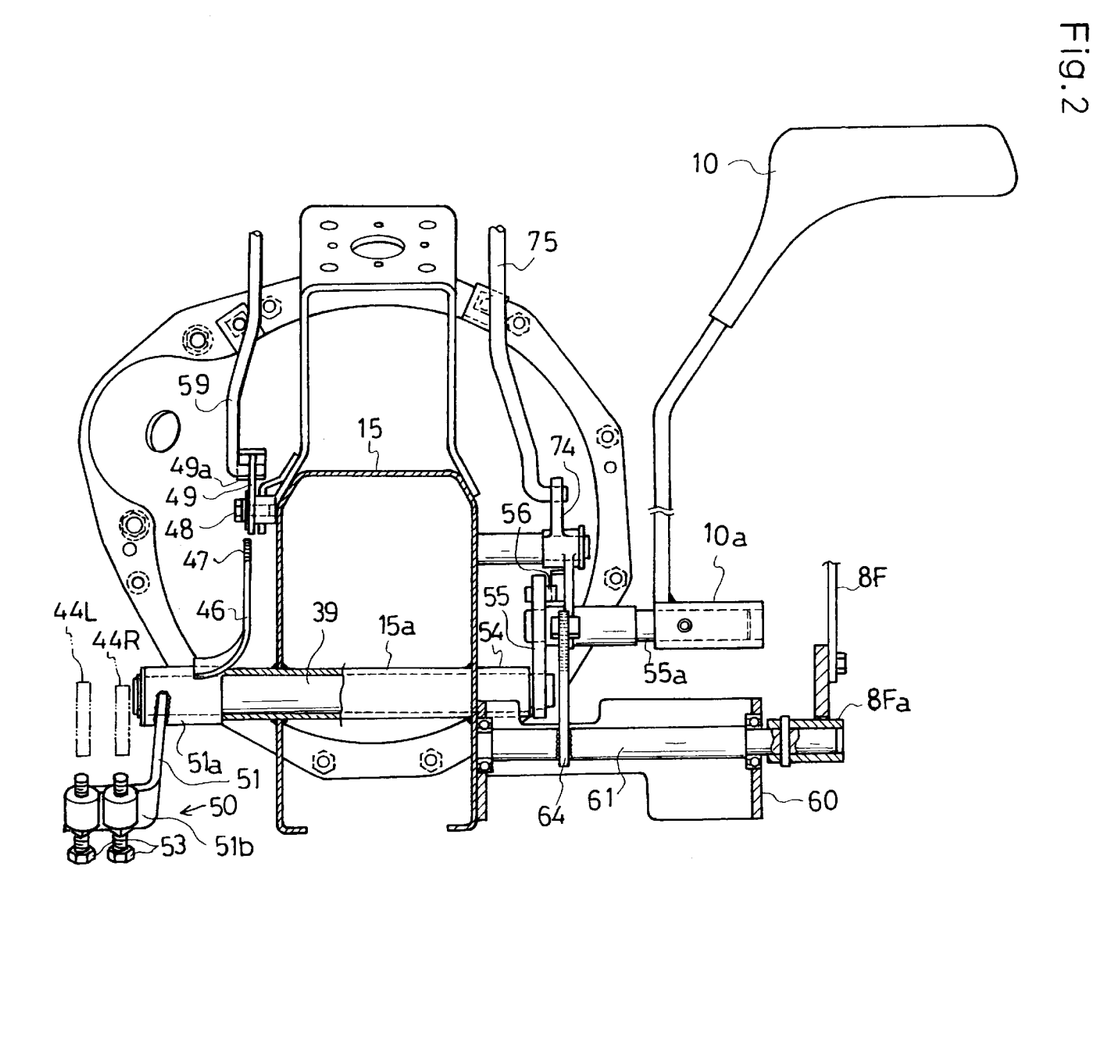
FIG. 2 is a sectional rear view showing mounting positions for a cruising control mechanism and a parking lock mechanism.
Figure 4:
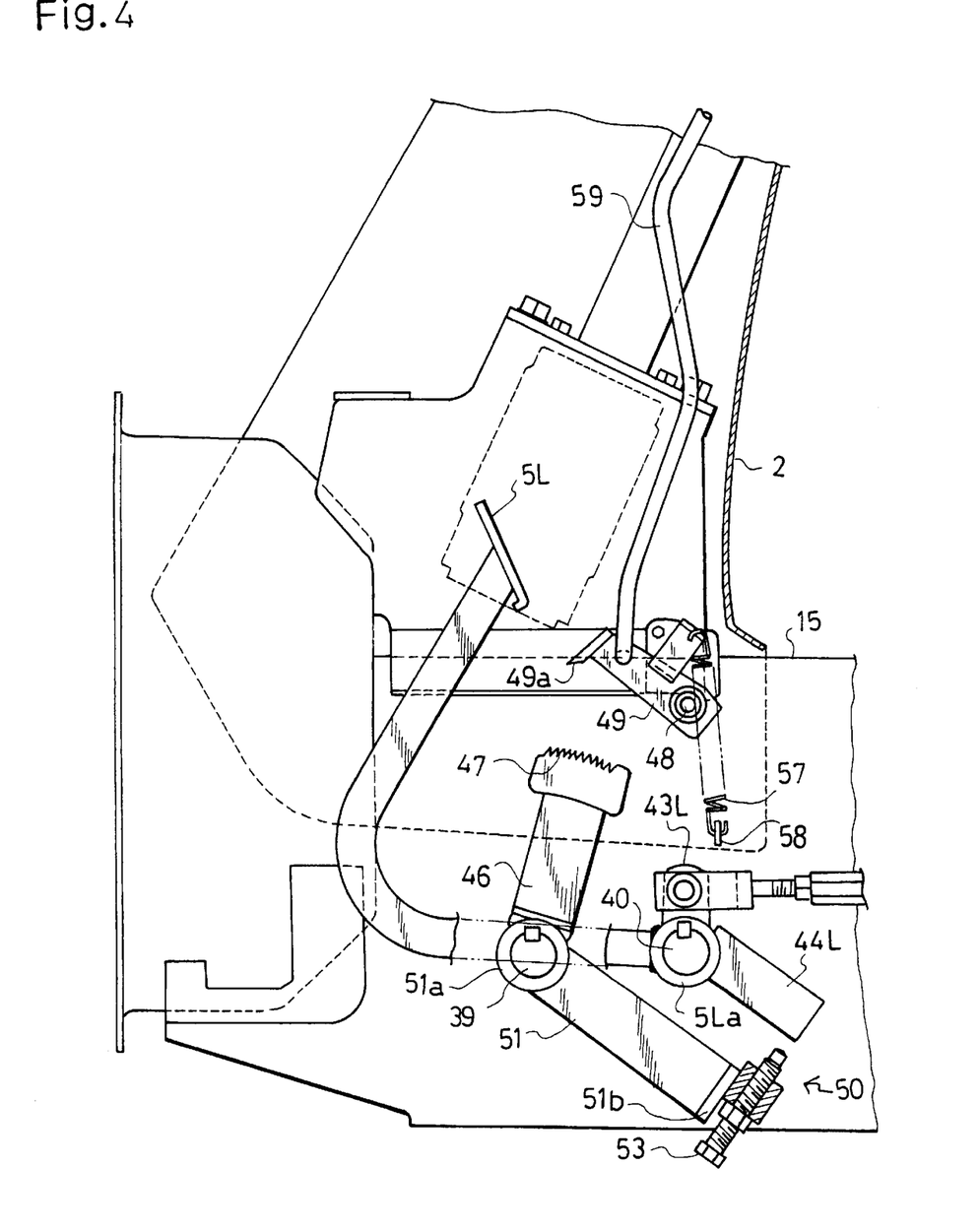
FIG. 4 is a left side view of the same.

Also, the left end of first brake pedal shaft 39 is provided with a simultaneous brake operating mechanism 50 for operating with master brake pedal 10 to simultaneously operate left turn brake pedal 5L and right turn brake pedal 5R. Specifically, as shown in FIGS. 2, 3 and 4, a tubular member 51a is not relatively-rotatably connected to the axial left end of first brake pedal shaft 39 through a key. A substantially L-shaped abutting arm 51, when viewed in plan, is fixed to tubular member 51a. The end of abutting arm 51 is laterally bent so as to form a leg 51b, the length of which is sufficient to cross abutting strips 44L and 44R. Leg 51b is provided with bolt-like-shaped abutting members 53 as an adjusting mechanism of timing for the abutting strips 44L and 44R. Abutting members 53 are screwably attached to leg 51b of abutting arm 51 in the relation that they freely advance and retreat at the upper ends thereof to keep a predetermined gap with respect to the lower surface of abutting strips 44L and 44R.

On the other hand, a tubular member 54 provided with a mounting bracket 55 is coupled with the axial right end of first brake pedal shaft 39 through a key. A pin 55a extends in parallel to first brake pedal shaft 39 and projects from the outer side surface of mounting bracket 55. A tubular member 10a, fixed to the base of master brake pedal 10, is coupled with pin 55a through another pin. Accordingly, when master brake pedal 10 is trod, mounting bracket 55 causes first brake pedal shaft 39 to rotate. Abutting arm 51 rotates counterclockwise, when viewed in FIG. 5, through tubular member 51a. Abutting members 53 push the lower surfaces of abutting strips 44L and 44R so as to rotate tubular members 5La and 5Ra counterclockwise to simultaneously press left and right turn brake pedals 5L and 5R downwardly, so that the left and right braking units are simultaneously actuated to enable the vehicle to stop.

Also, a parking lock mechanism is provided which can be locked when master brake pedal 10 is trod to simultaneously lock the braking force exerted on the left and right turn brakes. From tubular member 51*a,* an arm 46 projects upwardly. A ratchet 47 in a circular arc is fixed to the upper end of arm 46 and a large number of teeth are formed longitudinally in a row on the upper surface of ratchet 47. A support shaft 48 projects from the outer side surface of vehicle body frame 15 positioned rearwardly and upwardly of ratchet 47. A lock arm 49 is pivotally connected to support shaft 48, and a downwardly extending lock pawl 49*a* is formed at the free end of lock arm 49 and disposed above ratchet 47 so as to be engageable therewith.

Figure 5:
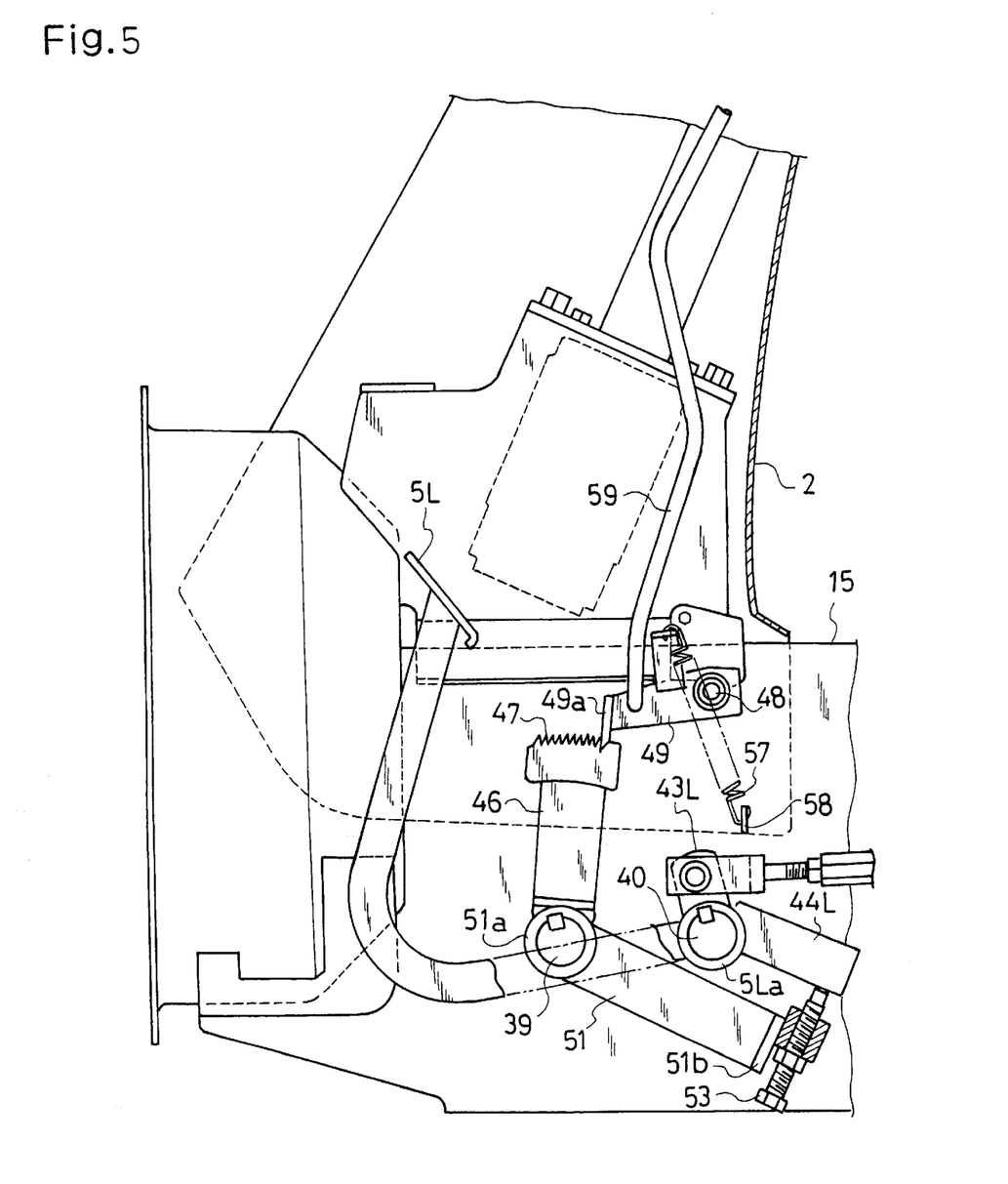
FIG. 5 is a left side view of the same when locked for parking.

A stay 58 projects from the side surface of vehicle body frame 15 below support shaft 48. A spring 57 is stretched between stay 58 and lock arm 49, so that spring 57 moves beyond the fulcrum so as to enable lock pawl 49*a* to be held in one of the positions where lock pawl 49*a* engages with or disengages from ratchet 47. Also, as shown in FIG. 1, the lower end of a rod 59 is fixed to lock arm 49 and is connected at its upper end with a parking lever 59*a* projecting rearwardly from the one lateral side (the left side in this embodiment) of the rear surface of dashboard 2 so that the operator can operate parking lever 59*a*. The parking lock mechanism described above is housed in a leftwardly lower space in dashboard 2 and covered thereby. In such construction, in order to set the parking lock mechanism, parking lever 59*a* is lifted while treading master brake pedal 10. This causes rod 59 to be pushed down. Lock arm 43, as shown in FIG. 5, swings counterclockwise around support shaft 48 and lock pawl 49*a* engages with ratchet 47. The engagement is maintained by the movement of spring 57 beyond the fulcrum thereof, whereby, even when master brake pedal 10 is released, it is in the locked state so as to maintain pressure on both brakes. In order to release the parking lock mechanism, parking lever 59*a* is pushed down. As shown in FIG. 4, this causes rod 59 to lift rock arm 49 which swings clockwise around support shaft 48. Lock pawl 49*a* disengages from ratchet 47 and is kept in this state by the movement of spring 57 beyond the fulcrum thereof, whereby master brake pedal 10 returns to the original position and both the braking units are released from the braking action.

Figure 6:
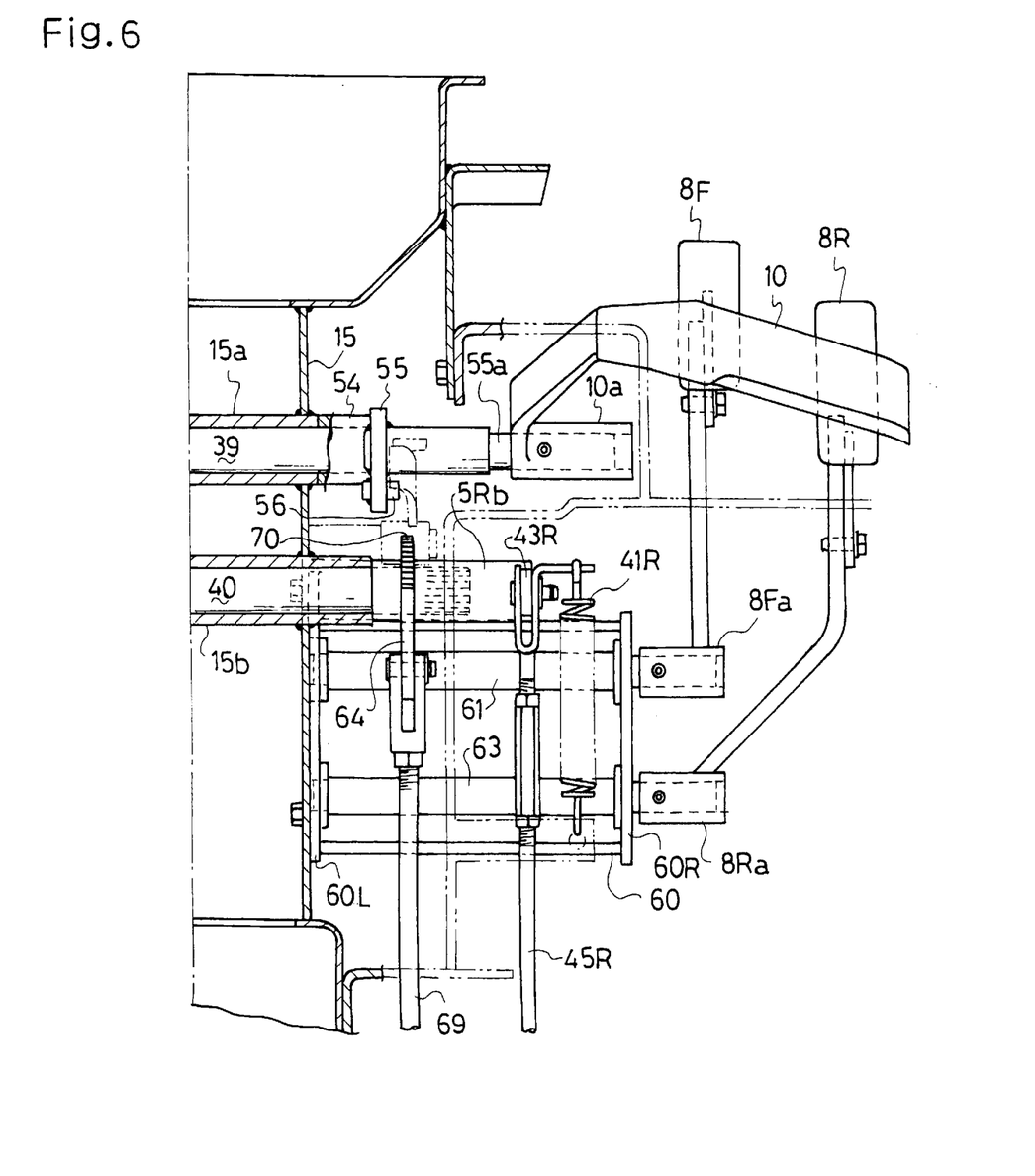
FIG. 6 is a sectional plan view showing a speed change operating unit and the cruising control mechanism.
Figure 9:
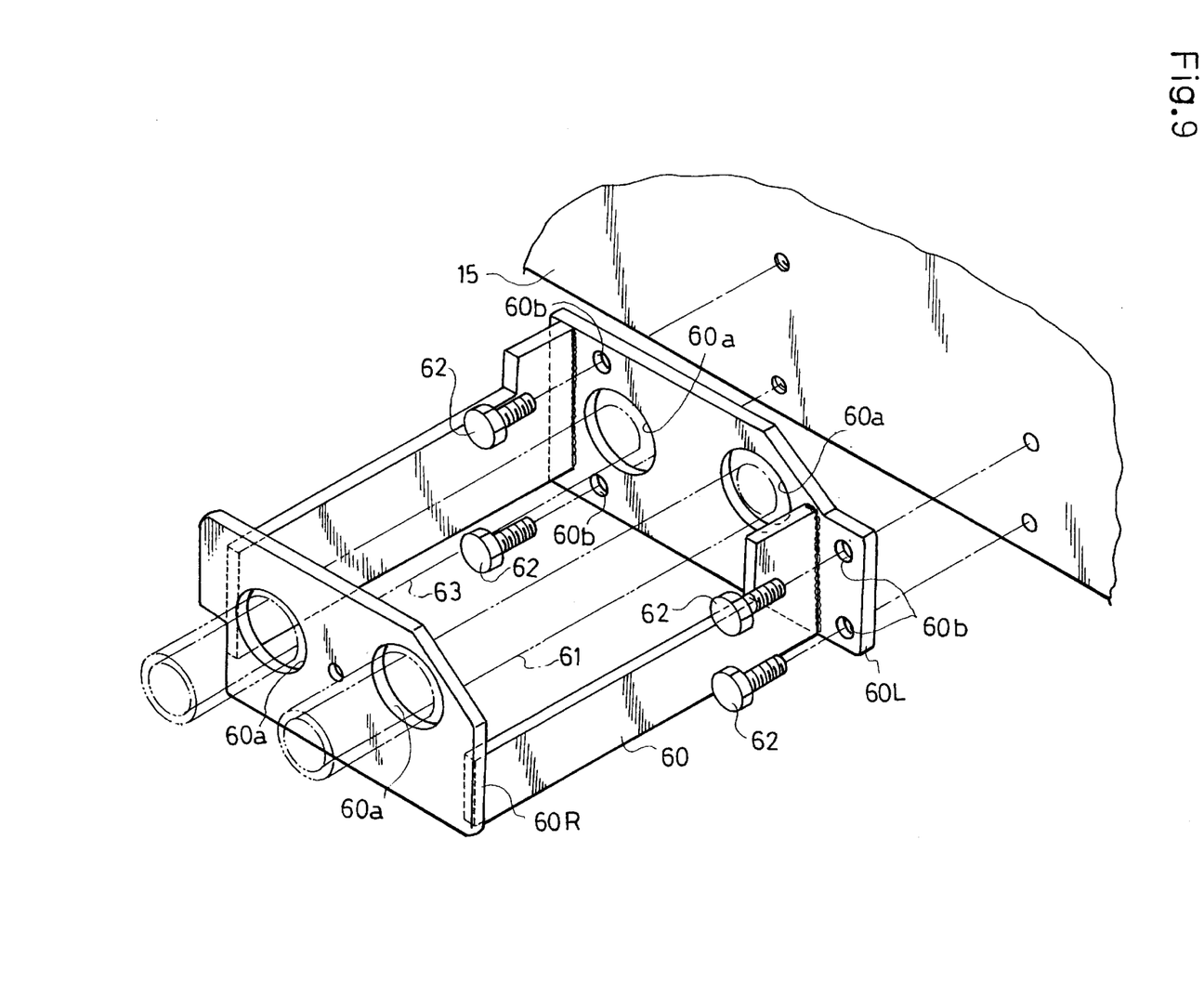
FIG. 9 is a perspective view of a pedal bracket.

Next, an operating mechanism for stepless control in the traveling direction (forward or reverse) and speed of the vehicle body will be explained. As shown in FIGS. 6 and 9, a pedal bracket 60 is formed with longer plates at the fore, rear, left, and right so as to be rectangular when viewed in plan. Pedal bracket 60 is mounted onto the right side surface of vehicle body frame 15 and under right side step 4. Side plates 60L and 60R of pedal bracket 60 include shaft bores 60*a* which are open and laterally aligned with each other. First pedal shaft 61 and second pedal shaft 63 are pivotally supported by bearings through shaft bores 60*a* such that they are longitudinally parallel to each other so as to construct a pedal unit. Left side plate 60L includes open bolt bores 60*b,* so that the pedal unit is detachably mounted onto the right side surface of vehicle body frame 15 through bolts 62 inserted into bolt bores 60*b.*

A tubular member 8F*a,* fixed to the base of forward pedal 8F, is coupled with one axial end of first pedal shaft 61 through a pin. A tubular member 8R*a,* fixed to the base of reverse pedal 8R, is coupled with the same axial end of second pedal shaft 63 through a pin. An arm 64 is fixed to first pedal shaft 61. Arm 64 is V-like-shaped when viewed from the side and has first and second legs (see FIG. 7). A roller 66 is rotatably supported to a pivot pin 64*a* provided on the first leg of arm 64. Meanwhile, an arm 65 is fixed to second pedal shaft 63 and is provided with an abutting leg 65*a* which abuts roller 66. A spring 67 is stretched between arm 65 and pivot pin 64*a* so as to bias abutting leg 65*a* to permanently abut against roller 66. One end of a link 69 is connected to the second leg of arm 64. The other end of link 69 is connected to the speed control arm (not shown) of hydraulic stepless transmission 52.

Figure 7:
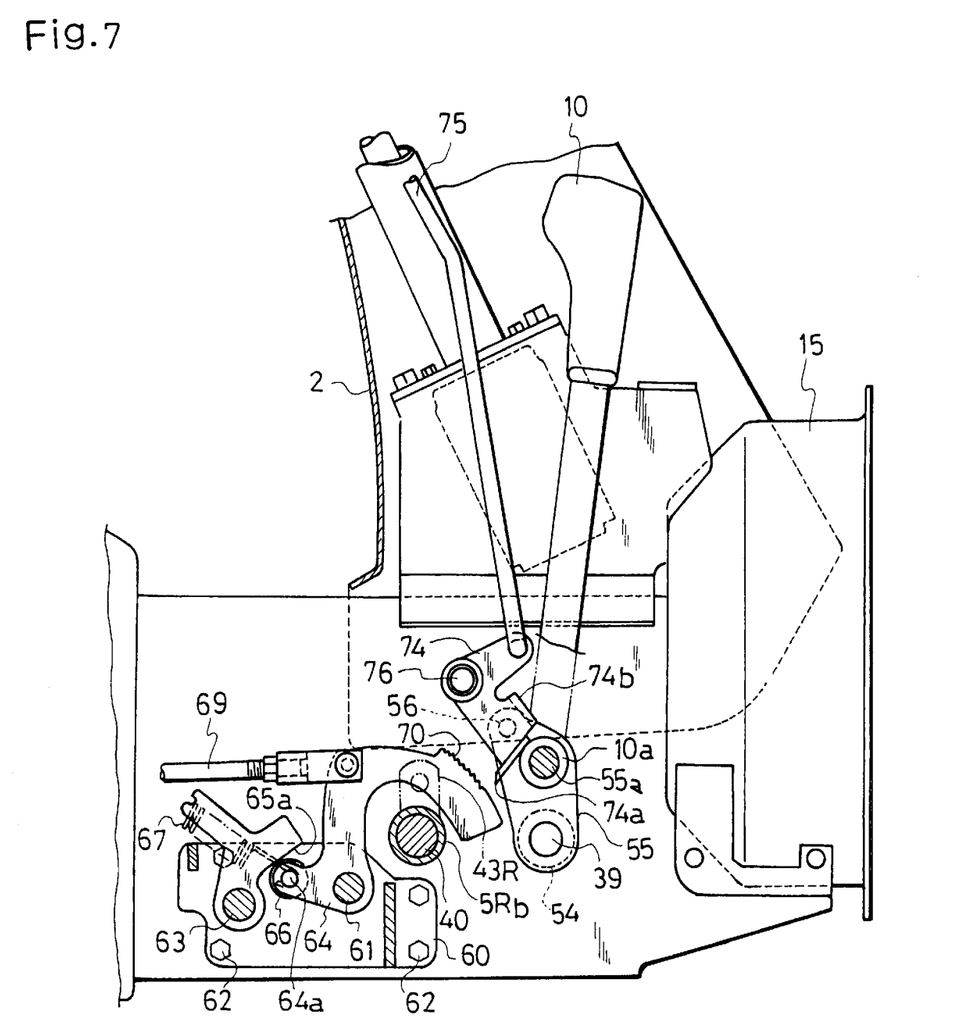
FIG. 7 is a right side view of the same.

In the above-mentioned construction, when forward pedal 8F is trod, arm 64 rotates clockwise around first pedal shaft 61 in FIG. 7. Link 69 is pulled towards the front of the vehicle body and the speed control arm (not shown) swings forward from the neutral position to operate hydraulic stepless transmission 52 to increase the forward speed of traveling the vehicle. Similarly, when reverse pedal 8R is trod, arm 65 rotates clockwise around second pedal shaft 63. Abutting leg 65*a* allows arm 64 to rotate counterclockwise through roller 66, so that link 69 is pushed towards the rear of the vehicle body. This causes the speed control arm (not shown) to swing rearwardly from the neutral position, thereby operating hydraulic stepless transmission 52 to accelerate the vehicle in the rearward direction. In addition, forward pedal 8F and reverse pedal 8R, when released from the operator's foot, are subject to a neutral biasing force of a spring acting on the speed control arm (not shown) and to the hydraulic reaction of hydraulic stepless transmission 52 so as to automatically return to the neutral (original) position of forward or rearward pedal 8F or 8R.

Figure 8:
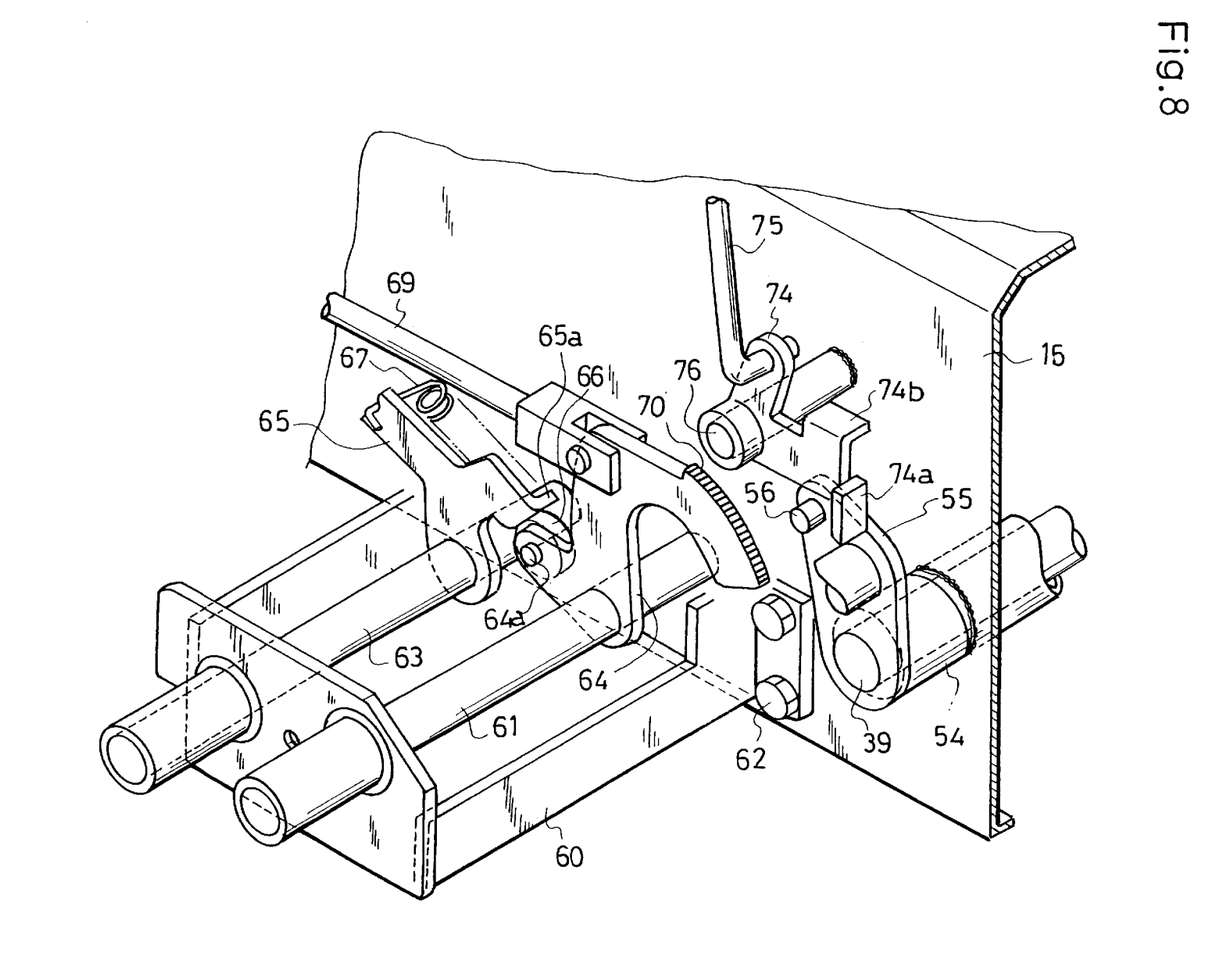
FIG. 8 is a perspective view of the same.

Next, a cruising control mechanism which can fix and release forward pedal 8F to and from a desired forward travel operating position will be explained. As shown in FIGS. 7 and 8, the utmost end of the second leg of arm 64 bends forward in a circular arc and is provided with a ratchet 70. Numerous teeth are formed in row on the upper surface of ratchet 70. A support shaft 76 projects from the outer side surface of vehicle body frame 15 and is positioned in front of ratchet 70. A locking arm 74 is swingably connected to support shaft 76 and includes a downwardly extending locking pawl 74*a* formed at its free end. Locking pawl 74*a* is disposed above ratchet 70 so as to be engageable with ratchet 70.

An abutting portion 74*b* is formed at locking arm 74. Abutting portion 74*b* is bent inwardly in an like-shape. A lock releasing pin 56 projects toward locking arm 74 from mounting bracket 55 supporting master brake pedal 10. Abutting portion 74*b* at locking arm 74 is positioned on the arc of the swinging motion of lock releasing pin 56. When the master brake pedal 10 is trod, mounting bracket 55 rotates clockwise around first brake pedal shaft 39, causing lock releasing pin 56 to abut against abutting portion 74*b* of locking arm 74, thereby rotating locking arm 74 counterclockwise around support shaft 76.

Figure 11:
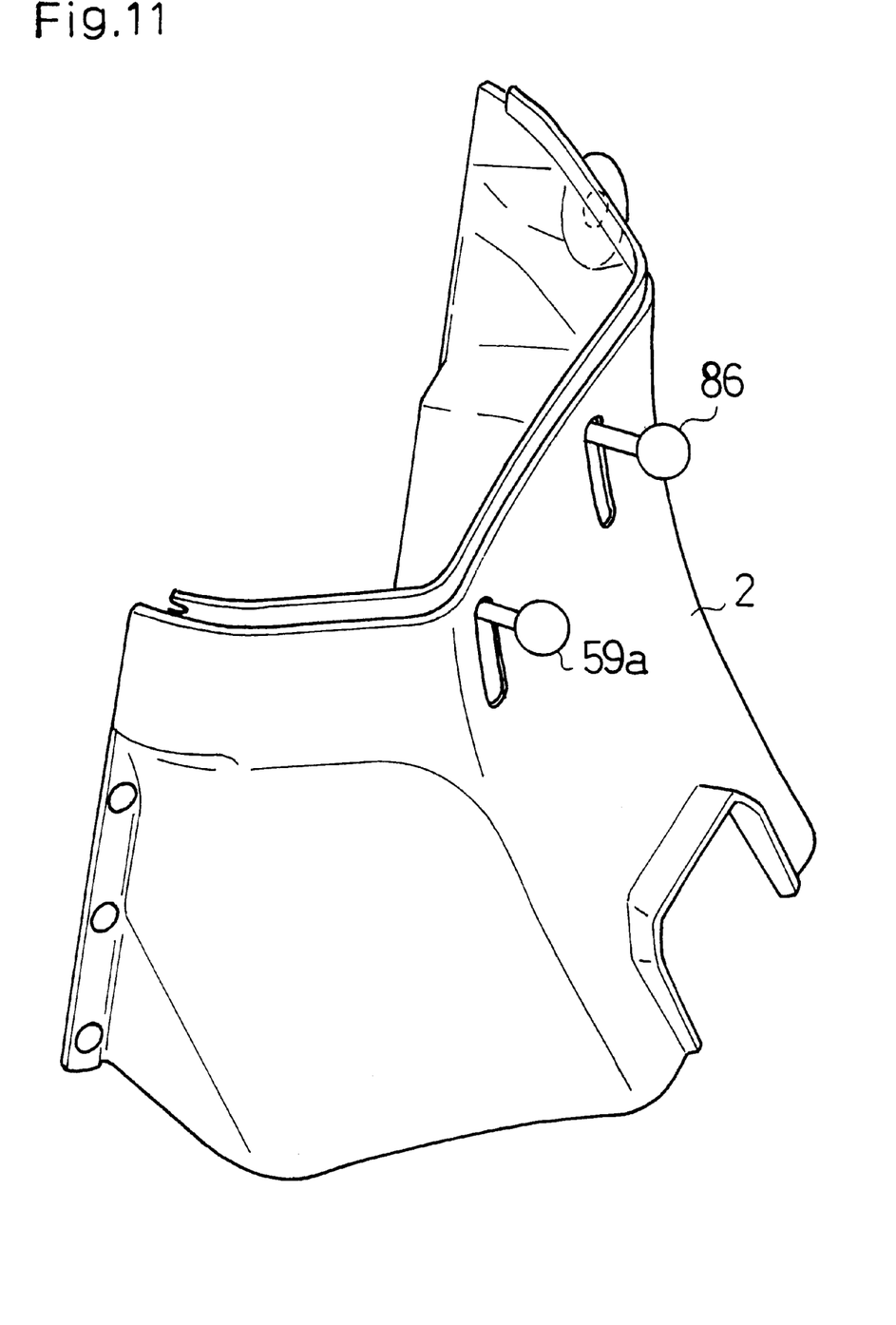
FIG. 11 is a perspective rear view of the dashboard showing the mounting construction thereto of a cruise control lever and parking lever which are operating units for the cruising control mechanism and parking lock mechanism.

Locking arm 74 (in FIG. 2) connects with a lower end of a rod 75. The upper end of rod 75 is connected to a cruise control lever 86 laterally adjacent (at the right side in this embodiment) to parking lever 59*a* as shown in FIG. 11. The cruising control mechanism described above is housed in the space formed rightwardly and downwardly of dashboard 2 so as to be protected from the outside.

Figure 10:
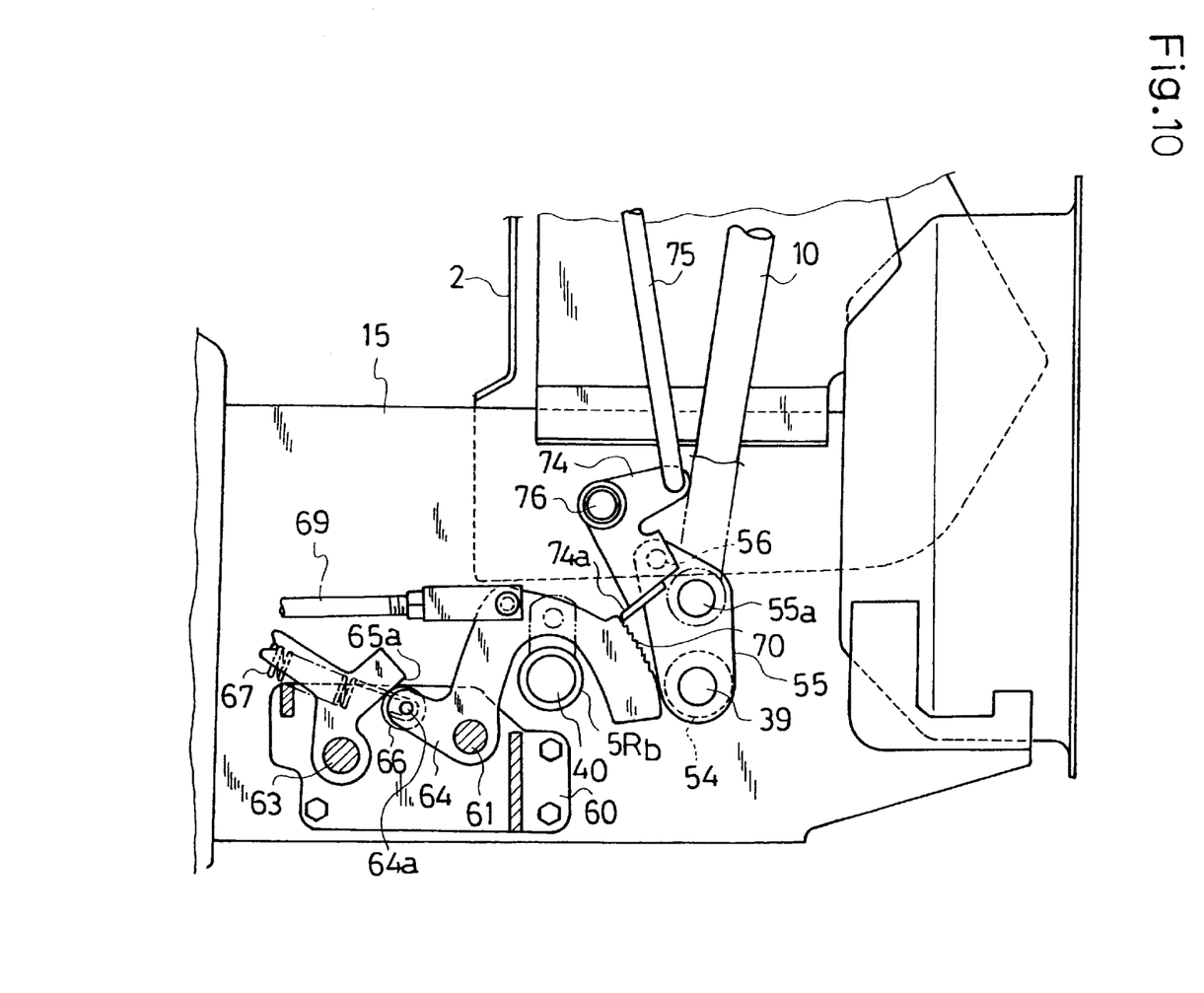
FIG. 10 is a right side view of the cruising control mechanism when speed-change is locked.

In such construction, when the operator lifts cruise control lever 86 from the position shown in FIG. 1, rod 75 is pushed down so as to rotate locking arm 74 clockwise around support shaft 76 as shown in FIG. 10. Locking pawl 74*a* engages with a tooth of ratchet 70 fixed to arm 64. The tooth engaged depends on how far pedal 8F is pressed. Arm 64 is subject to the counterclockwise force generated around first pedal shaft 61 by the above-mentioned neutral bias spring and hydraulic reaction of hydraulic stepless transmission 52. Locking pawl 74a and the teeth of ratchet 70 are formed such that a predetermined frictional-holding force is exerted when they engage, whereby, even when the operator releases cruise control lever 86, locking pawl 74a remains engaged with a tooth of ratchet 70. Thus, forward pedal 8F can be fixed to the predetermined forward traveling operation position. And, even when the operator releases forward pedal 8F, hydraulic stepless transmission 52 is continuously driven and the vehicle body runs at a constant speed.

While in the cruising control operation, if master brake pedal 10 is trod to exert the braking effect of the left and right braking units, lock releasing pin 56 projecting from mounting bracket 55 rotates clockwise around first brake pedal shaft 39 to abut against abutting portion 74b of abutting arm 74. Locking arm 74 receives the forces from lock releasing pin 56a and a tension spring so as to rotate counterclockwise around support shaft 76, causing locking pawl 74a to forcibly disengage from the tooth of ratchet 70. Hence, forward pedal 8F is released, so that the speed control arm of hydraulic stepless transmission 52 and forward pedal 8F are subject to the action of the neutral biasing spring and the hydraulic reaction so as to return to the neutral position, thereby quickly stopping the vehicle without stopping engine E. In addition, when locking arm 74 is rotated counterclockwise, rod 75 is pushed upward to release cruise control lever 86. Hence, when the vehicle travels forward again, the operator continuously treads forward pedal 8F until a desired vehicle speed is obtained, and cruise control lever 86 is again lifted to maintain the vehicle at a constant forward speed.

Figure 12:
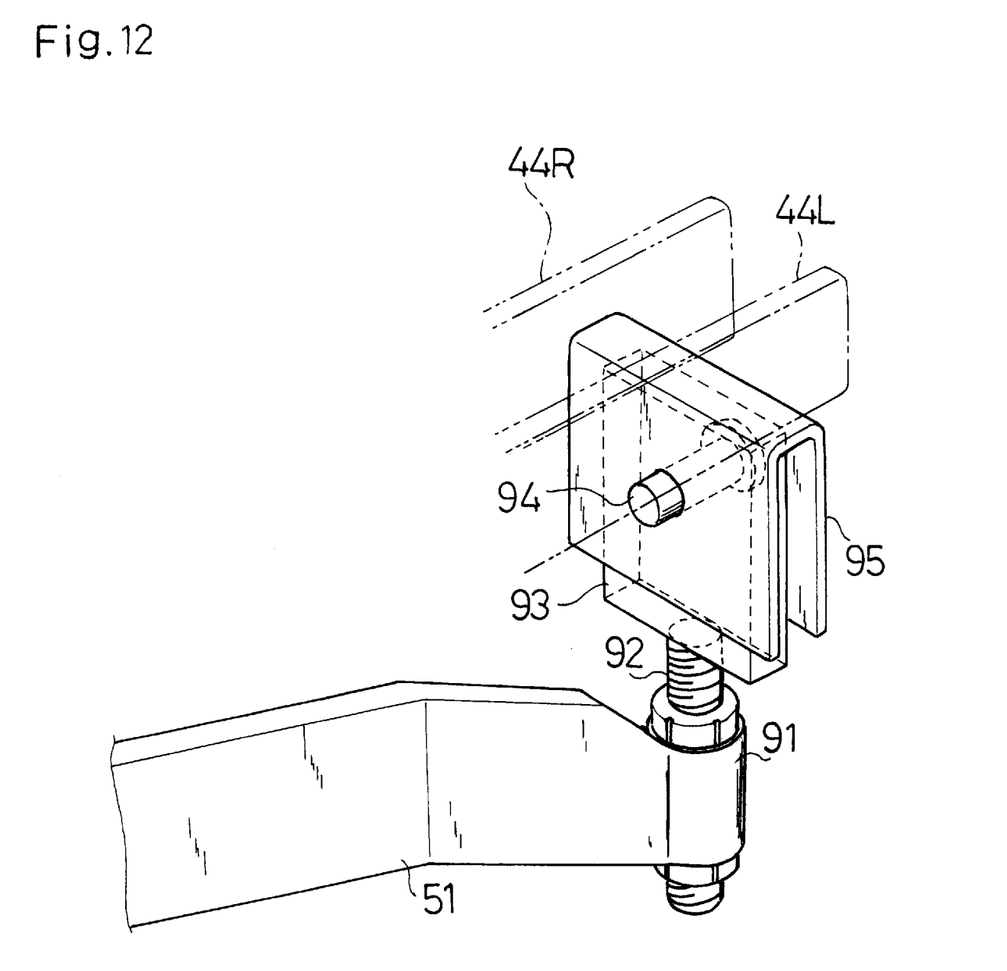
FIG. 12 is a perspective view of an abutting timing adjusting mechanism for a master brake pedal when equipped with an equalizer.
Figure 13:
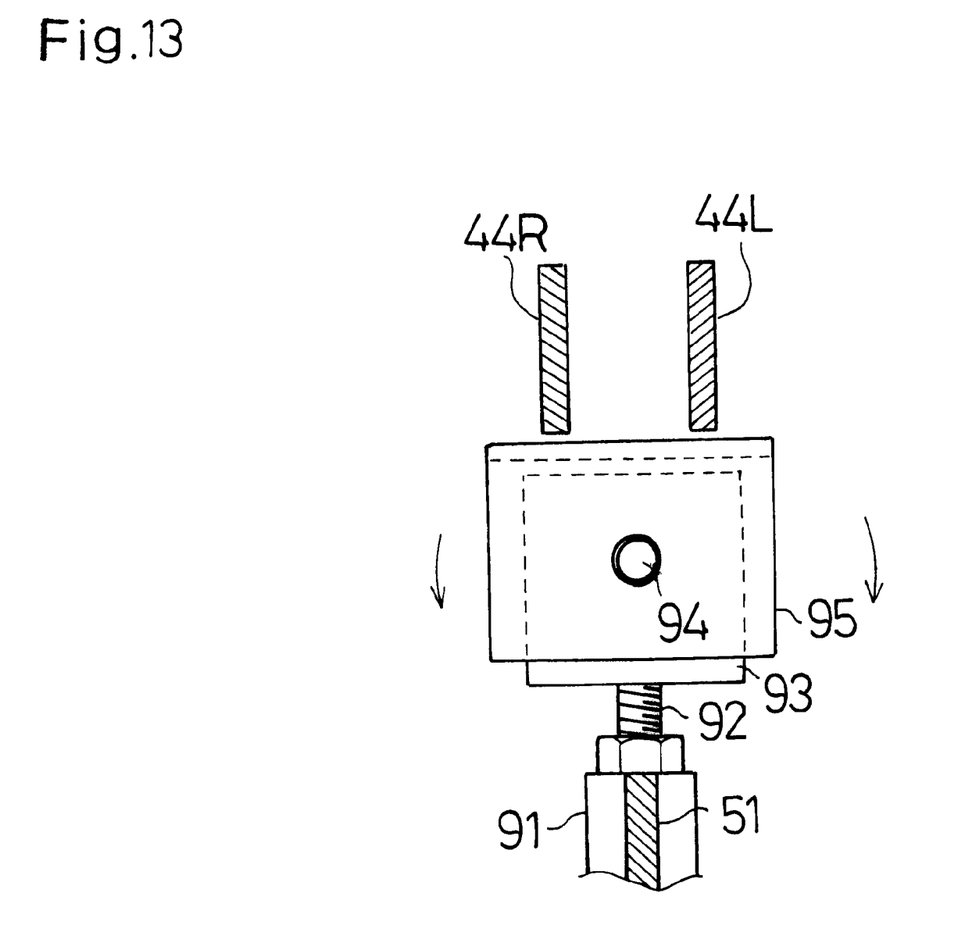
FIG. 13 is a partially sectional front view of the same.

In another embodiment, as shown in FIGS. 12 and 13, an equalizer function may be added to the above-mentioned abutting timing adjusting mechanism with respect to left and right turn brake pedals 5L and 5R. In detail, one mounting member 91 is welded to the free end of abutting arm 51 in a manner of vertically directing a screw bore, with which a bolt 92 is screwably attached such that it can advance and retreat freely. A support plate 93 is welded perpendicularly onto the head of bolt 92. A pivot pin 94 is mounted on the lateral center of support plate 93 and extends axially longitudinally. A swinging member 95, U-like-shaped in section and of a length across abutting strips 44L and 44R, covers support plate 93 and is supported by pivot pin 94 so as to be freely laterally swingable around pivot pin 94. If master brake pedal 10 is trod when the left and right braking units are not laterally equally idling, the upper end of swinging member 95 slants leftwardly or rightwardly when abutting against abutting strips 44L and 44R, so as to simultaneously lift both abutting strips 44L and 44R in a slanted state.

The present invention, constructed as mentioned above, has the following effect:

The speed changing member for the stepless transmission can artificially be held in the desired speed change position by the cruising control mechanism. The cruising control mechanism is interlocked such that it is released by treading the master brake pedal. The cruising control mechanism is disposed at one lateral side of the dashboard, and the parking locking mechanism, which can be held in the treading position of the master brake pedal, is disposed at the other lateral side. The cruising control mechanism and parking lock mechanism are therefore contained in the dashboard, so as to reduce the effect of dust or water entering therein. This helps prevent clogging, poor engagement, and not smooth rotation of the engaging portions and pivotally mounting portions of the mechanisms. Also, the link construction for the respective mechanisms can be laterally divided and compactly disposed in the dashboard.

The operating levers for actuating the cruising control mechanism and parking locking mechanism are disposed in the dashboard. On one lateral side wall of the vehicle body frame covered with the lower end of the dashboard, the pawl engageable with the locking member interlocked with the speed change instrument of the stepless transmission is pivotally supported. On the other lateral side, the pawl engageable with the locking member interlocked with the master brake pedal, is pivotally supported. Therefore, the locking pawls for the cruising control mechanism and parking lock mechanism are laterally divided from each other so as not to interfere with each other, thereby enabling the respective locking mechanisms to be simple in construction.

The speed changing instrument comprises the forward pedal trod to cause the vehicle body to travel forwardly and the reverse pedal trod to cause the same to travel rearwardly. Both pedals are constructed as a single pedal unit detachably mounted on one lateral side wall of the vehicle body, whereby the speed changing instrument can be easily assembled and disassembled.

Also, the operating lever for actuating the cruising control mechanism is disposed at one lateral side of the rear surface of the dashboard where the cruising control mechanism is disposed, and the operating lever for actuating the parking locking mechanism is disposed at the other lateral side where the parking locking mechanism is disposed. The two operating levers are juxtaposed on the rear surface of the dashboard in front of the operator's seat such that they are well visible and are suitable for a small-sized working vehicle restricted in installation space.

While an embodiment of the invention has been shown and described, it is not intended that the scope of the invention be limited to the specific embodiment described. Rather, the scope of this invention is to be determined by the appended claims and their equivalents.

What is claimed is:

1. A traveling operation device for a vehicle comprising:
    a cruising control mechanism which can artificially hold a speed changing instrument in a desired speed change position for a stepless transmission biased to the neutral side;
    a master brake pedal interlocked to release said cruising control mechanism when trod; and
    a parking lock mechanism, which can hold said master brake pedal in the position where said master brake pedal is trod, wherein said cruising control mechanism and said parking lock mechanism are disposed within a dashboard of the vehicle, said dashboard including left and right sides, wherein one of said cruising control mechanism and parking lock mechanism is disposed on said left side within said dashboard and the other of said cruising control mechanism and parking lock mechanism is disposed on said right side within said dashboard.

2. A traveling operation device for a working vehicle comprising:
    a cruising control mechanism which can artificially hold a speed changing instrument in a desired speed change position for a stepless transmission biased to the neutral side;
    a master brake pedal interlocked to release said cruising control mechanism when trod; and
    a parking lock mechanism, which can hold said master brake pedal in the position where said master brake pedal is trod, wherein said cruising control mechanism and said parking lock mechanism are disposed within a dashboard of the vehicle, said dashboard including left and right sides, wherein one of said cruising control mechanism and parking lock mechanism is disposed on said left side within said dashboard and the other of said cruising control mechanism and parking lock mechanism is disposed on said right said within said dashboard, wherein an operating lever for actuating said cruising control mechanism and an operating lever for actuating, said parking locking mechanism are disposed on said dashboard, a locking pawl engageable with a locking member interlocked with said speed changing instrument for said stepless transmission is swingably pivoted onto one lateral side wall of a frame of the vehicle body and is covered with a lower end of said dashboard, and a locking pawl engageable with a locking member interlocked with said master brake pedal is swingably pivoted onto another lateral side wall of the vehicle body frame such that each of said locking pawls interlocks with its respective operating lever.

3. A traveling operation device for a vehicle as set forth in claim 1, wherein said speed changing instrument comprises a forward pedal, which is trod to cause said vehicle body to travel forward, and a reverse pedal, which is trod to cause said vehicle body to travel rearwardly, both of said pedals being constructed as a single pedal unit detachably mountable onto one lateral side wall of said vehicle body frame.

4. A traveling operation device for a vehicle as set forth in claim 2, wherein said speed changing instrument comprises a forward pedal, which is trod to cause said vehicle body to travel forward, and a reverse pedal, which is trod to cause said vehicle body to travel rearwardly, both of said pedals being constructed as a single pedal unit detachably mountable onto one lateral side wall of said vehicle body frame.

5. A traveling operation device for a working vehicle as set forth in claim 2, wherein said operating lever for actuating said cruising control mechanism and said operating lever for actuating said parking lock mechanism are juxtaposed on a rear surface of said dashboard.

6. A traveling operation device for a working vehicle as set forth in claim 3, wherein said operating lever for actuating said cruising control mechanism and said operating lever for actuating said parking lock mechanism are juxtaposed on a rear surface of said dashboard.

* * * * *

UNITED STATES PATENT AND TRADEMARK OFFICE
CERTIFICATE OF CORRECTION

PATENT NO. : 6,164,396

DATED : December 26, 2000

INVENTOR(S) : Mizuya Matsufuji

It is certified that error appears in the above-identified patent and that said Letters Patent is hereby corrected as shown below:

In column 9, line 12, after "activating" delete ",".

Signed and Sealed this

Twenty-ninth Day of May, 2001

Attest:

NICHOLAS P. GODICI

Attesting Officer

Acting Director of the United States Patent and Trademark Office